United States Patent [19]

Griebeler

[11] 4,282,763
[45] Aug. 11, 1981

[54] COMPOUND OSCILLATOR

[75] Inventor: Elmer L. Griebeler, Cleveland Heights, Ohio

[73] Assignee: C-R-O, Inc., Menomonee Falls, Wis.

[21] Appl. No.: 39,200

[22] Filed: May 15, 1979

[51] Int. Cl.³ ............... F16H 27/02; F16H 21/44
[52] U.S. Cl. ............... 74/89.15; 74/99 R; 74/101
[58] Field of Search ......... 74/99 R, 101, 102, 103, 74/105, 106, 89, 89.15, 522, 828, 831, 832, 833, 834

[56] References Cited

U.S. PATENT DOCUMENTS

| 299,954 | 6/1884 | Buckley | 74/522 |
|---|---|---|---|
| 436,139 | 9/1890 | Juengst | 74/522 X |
| 2,826,929 | 3/1958 | Lincoln et al. | 74/99 X |
| 2,834,218 | 5/1958 | Lovell | 74/522 X |
| 3,974,709 | 8/1976 | Janson et al. | 74/89.15 X |

FOREIGN PATENT DOCUMENTS

| 234235 | 6/1964 | Austria | 74/89.15 |
|---|---|---|---|
| 24994 | 7/1960 | German Democratic Rep. | 74/89.15 |
| 277108 | 9/1927 | United Kingdom . | |
| 481042 | 3/1938 | United Kingdom . | |
| 1013719 | 12/1965 | United Kingdom . | |
| 1180311 | 2/1970 | United Kingdom . | |
| 1231971 | 5/1971 | United Kingdom . | |

Primary Examiner—Lawrence J. Staab
Attorney, Agent, or Firm—Andrus, Sceales, Starke & Sawall

[57] ABSTRACT

An apparatus for providing oscillatory motion is described. The apparatus comprises drive means and an adjustable member to provide a lever of the first, second or third class, or a means having no leverage component.

14 Claims, 6 Drawing Figures

COMPOUND OSCILLATOR

BACKGROUND OF THE INVENTION

1. Field of the Invention

The present invention is in the field of apparatus for the production of oscillatory motion. More specifically, this invention is in the field of apparatus capable of providing oscillatory motion of varying magnitude and nature, and adjustable to provide any combination of linear and pendulum oscillatory motion.

2. Description of the Prior Art

There are known in the mechanical art various means of imparting oscillatory motion to devices such as tools, machine components and the like, and means for multiplying or apportioning magnitude and direction of force to devices. Among such means are included levers, pulleys, and inclined planes in the category of simple machines, and more complicated methods of achieving some of the same results, including motors with bidirectional capability, gear trains, and shafts having bidirectional threads and reciprocating followers, where the shaft is driven in one rotational direction and the follower provides a linear reciprocating action.

In the field of automatic welding, for instance, it is often necessary to weld a relatively wide seam, i.e., one where the width of the seam to be welded is more than about three or four times the diameter of the filler wire used. In such cases, it is currently necessary to effect the weld by multiple passes, that is, by causing the welding torch to weld a plurality of seams, disposed such that each seam is contiguous with and fused to the base metal or a preceding seam, or both. However, it is more economical to effect such a weld in one pass, thereby reducing the time involved with both the machine and the operator. At the present time, there is no realistically economical method of effecting such a single-pass weld.

In other fields, such as machining, it is sometimes desirable to apply a tool to a part in other than a direct linear fashion. Such operations are required, e.g., where a cam is being machined on a lathe or milling machine, and the surface of the cam is not an arc of a circle; the application of the tool would then require that the tool be moved in correlation with the movement of the part by the machine. In the alternative, various interconnecting gear arrangements are used to provide movement of the tool in relation to the movement of the part by the machine.

SUMMARY OF THE INVENTION

The present invention comprises apparatus for providing oscillatory motion, having drive means, mounting frame and guide means, a first link and a second link, a central member, an adjustable resultant member, and carrier means, the central member being pivotally mounted on the carrier means, and the adjustable resultant member being movably mounted on the central member. In one embodiment of the invention, the central member is provided with drive means for moving the adjustable resultant member along the central member. In another embodiment, drive means are provided to move the central member without motion of the carrier means, or independently of the motion of the carrier means.

DESCRIPTION OF THE PREFERRED EMBODIMENTS

The preferred embodiment of the present invention comprises apparatus for providing oscillatory motion, having drive means, mounting frame and guide means, a first link, a second link, a central member, an adjustable resultant member, and carrier means, the central member being pivotally mounted on the carrier means, and the adjustable resultant member being movably mounted on the central member.

Figure 1:
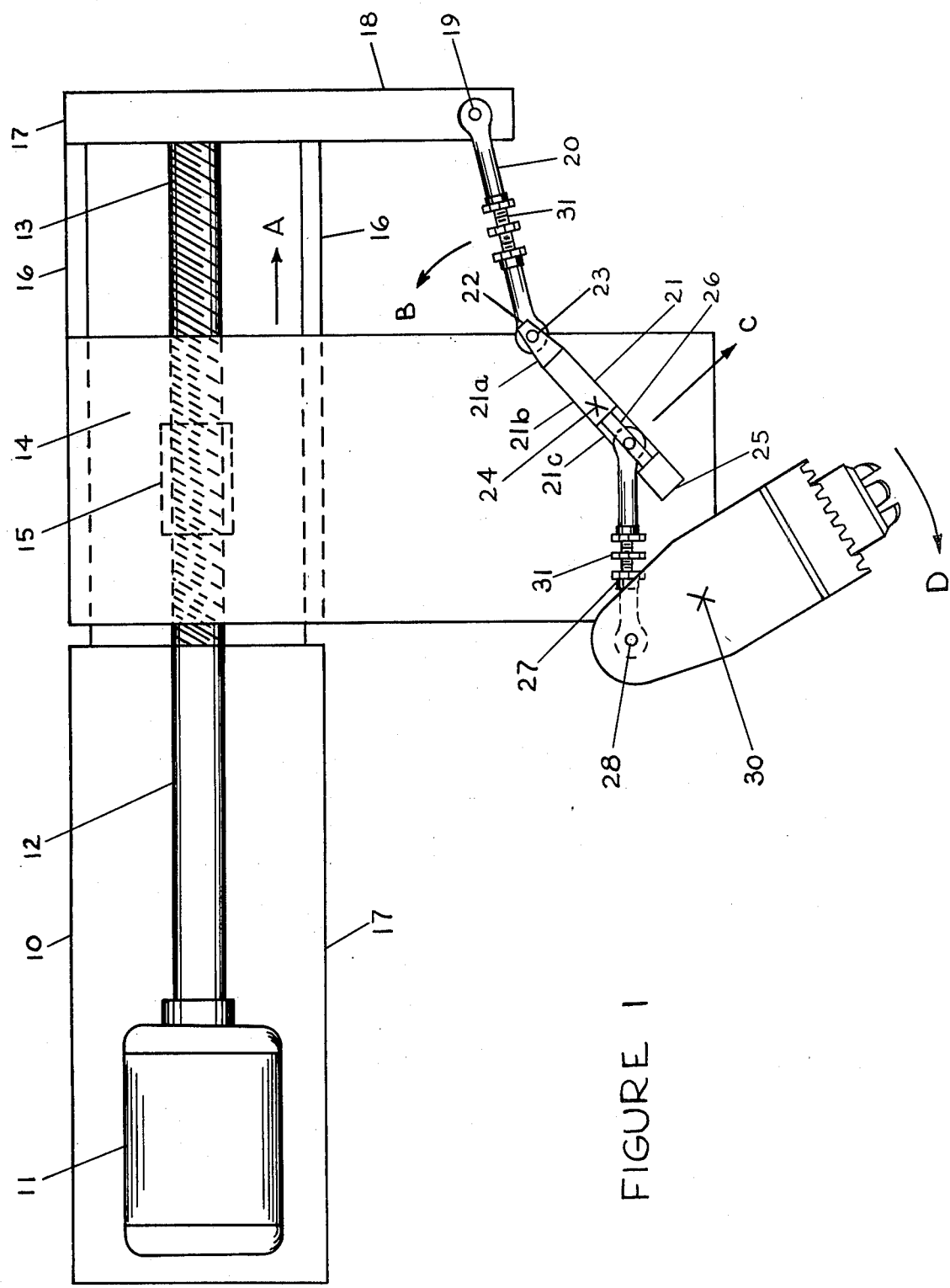
FIG. 1 is an elevational view of the apparatus of the present invention.

Referring now to FIG. 1, the apparatus is shown generally at 10; drive means 11 may be any convenient method of providing motive power, and is shown here as an electric motor, although those skilled in the art will realize that many other forms of power could be supplied, such as, e.g., a take-off shaft from another power source, associated with or independent from the apparatus of the present invention. A drive shaft 12 is driven from drive means 11, and carries threads 13.

Carrier 14 has rigidly affixed to the underside thereof, as viewed in FIG. 1, receptacle 15, having internal threads complementary to those of shaft 12, and engaged therewith, to provide motion to carrier 14 on suitable operation of drive means 11. Guides 16 maintain carrier 14 in desired juxtaposition with the work piece or other object, as will be explained more fully hereinbelow. Mounting frame 17 serves to hold the component parts. An extension 18 provides a frame portion depending from frame 17, and provides a point 19 of pivotal attachment for first link 20, as set forth below. Carrier 14 is rectilinearly movable relative to point 19. While extension 18 is shown at one end of frame 17 in FIG. 1, those skilled in the art will realize that it is within the scope and spirit of this invention to affix it at or near the opposite end, or at any convenient fixed location.

First link 20 is pivotally affixed at one end thereof to point 19, and at the other and thereof to central member 21. Central member 21 is divided into three segments 21a, 21b and 21c. Segment 21a is defined by the first end 22 and first-link attachment 23; segment 21b is defined by first-link attachment 23 and fulcrum 24; segment 21c is defined by fulcrum 24 and second end 25. Fulcrum 24 serves as a pivotal attachment of central member 21 to carrier 14.

Adjustment resultant member 26 is movably mounted on central member 21, and is pivotally affixed to second link 27 at one end thereof. The opposite end of second link 27 is pivotally affixed at point 28 to the desired device or article to which oscillatory motion is to be imparted, such as, e.g., a welding torch or suitable tool holder 29. In the apparatus shown, tool holder 29 is shown as pivotally mounted at point 30 on carrier 14. However, those skilled in the art will realize that the apparatus of the present invention could serve to impart a reciprocal motion to holder 29 by eliminating the attachment at point 30, and securing holder 29 in appropriate guide means, not shown.

First link 20 and second link 27 are provided with adjustment means 31 by which the effective length of each may be varied for the requirements of any particular application of the apparatus. While such adjustment means is not shown for central member 21, it is within the scope and spirit of this invention to provide adjustment means to vary the effective length of central member 21 as appropriate.

In the operation of the apparatus of the present invention, drive means 11 turns shaft 12, whereby carrier 14 moves in the direction indicated by A. First link 20, being rigid, holds central member 21 at first-link attachment 23 stationary with respect to frame 17. Due to the movement of carrier 14, central member 21, pivoting on fulcrum 24, moves in an arc as indicated by B in FIG. 1. Adjustable resultant member 26, shown here as being in segment 21c of central member 21, moves in the arc shown by C in the drawing. Because of this movement and the movement of carrier 14, second link 27 moves in a direction which is a resultant of the two motions, and is substantially parallel with that of carrier 14. Holder 29, pivotally mounted on carrier 14, moves in an arc D which is the resultant of the linear motion A of carrier 14 minus the arcuate motion imparted to holder 29.

As illustrated in FIG. 1, resultant member 26 is disposed in segment 21c of central member 21. Because of its juxtaposition on the opposite side of fulcrum 24 from the point where force is applied at first-link attachment 23, the arrangement provides a lever of the first class. If resultant member 26 were adjusted to a location on segment 21b, a lever of the second class would be in effect, and the direction of arc C would be reversed, as would the resultant arc D of holder 29. On moving resultant member 26 further along member 21 to segment 21a, the applied force at first-link attachment 23 would be between the fulcrum at 24 and the resultant at 26, and a lever of the third class would obtain. In this last case, directions C and D would be the same as with the lever of the second class; that is, opposite in direction to that shown on the drawing, but of a greater magnitude than in the case of the second-class lever. By suitable selection of the placement of resultant member 26, therefore, the direction and amount of travel of holder 29 can be chosen.

Thus, the present invention is useful in such applications as complex forming operations where, e.g., the holder 29 is used to hold a scribing or cutting tool to be applied to a work-piece moving in a lathe.

With the apparatus of the present invention, there are two special cases which can be obtained to secure movement of holder 29. One is the case which exists when the pivotal center of resultant member 26 is coincident with the center of first-link attachment 23; the other occurs when resultant member 26 is coincident with fulcrum 24.

When resultant member 26 and the point of first-link attachment 23 are coincident, central member 21 is effectively removed from the linkage, and the system behaves as if first link 20 and second link 27 were simply a fixed link between stationary point 19 and point 28 on the holder. The holder, including whatever object is held thereby, pivots in space about a point in line with point 28 and point 30, and beyond point 30 by an amount equal to the distance between point 28 and point 30. In the case where the distance from point 28 to the pivotal attachment point 30 of holder 29 is equal to the distance from that point 30 to the end of the tool or other object held thereby, the linear motion of end of the object or tool will be zero, irrespective of the motion of carrier 14.

When resultant member 26 is placed directly on fulcrum 24, the net effect is to remove second link 27 from the system, and operation of the carrier 14 will result in only linear motion of holder 29, with no arcuate component thereto.

By suitable juxtaposition of the adjustable resultant member 26, the apparatus of the present invention can therefore be made to cause holder 29 to hold an object in a fixed position, move it is a straight line, or move it in an arc either additive to or opposite from the movement of carrier 14, effectively pivoting the object at almost any point along its length or well beyond to plus and minus infinity.

Figure 2:
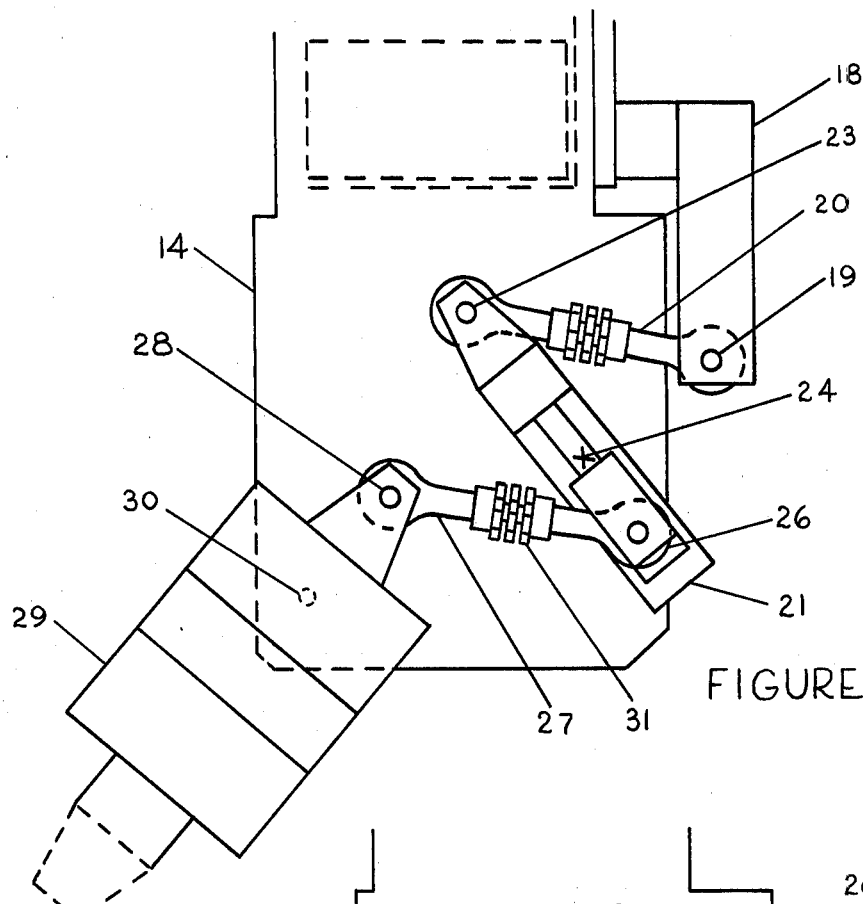
FIG. 2 is an elevational view of the central member and the adjustable resultant member, adjusted to provide oscillatory travel of the second link.

FIG. 2 shows a portion of the apparatus of the present invention, where resultant member 26 is positioned in segment 21c of central member 21 in FIG. 1, and carrier 14 is close to the far end of its travel. The effect of this positioning is to cause holder 29 to swing to the left, as shown in FIG. 2, as carrier 14 is operated to the right.

Figure 3:
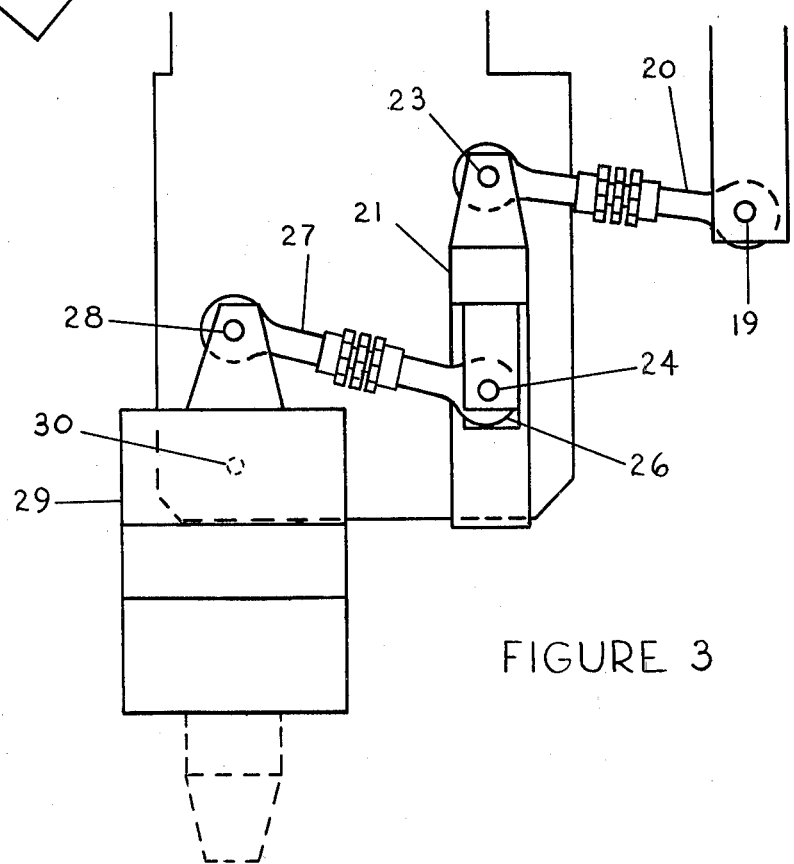
FIG. 3 is an elevational view of the central member and the adjustable resultant member, adjusted to provide no motion of the second link.

FIG. 3 shows the special case where resultant member 26 is set at the fulcrum 24, and holder 29 therefore maintains one position with respect to carrier 14, and moves in a straight line as hereinabove described.

In FIG. 1, adjustable resultant member 26 is shown disposed in a position to produce a lever of the first class with the apparatus of the invention. It is apparent that suitable locking means are necessary to maintain the member in the desired juxtaposition relative to the rest of the apparatus; for clarity of illustration, such locking means are not shown, although those skilled in the art are aware that a wide variety of such means could be employed, including, e.g., set screws, locking nuts, detents, matching hole-and-pin arrangements, and the like. Further, however, a capability is provided in the apparatus of the present invention comprising drive means for member 26 to permit its being positioned at any given location along the length of central member 21, and for adjusting that position while the apparatus is in operation.

Figure 4:
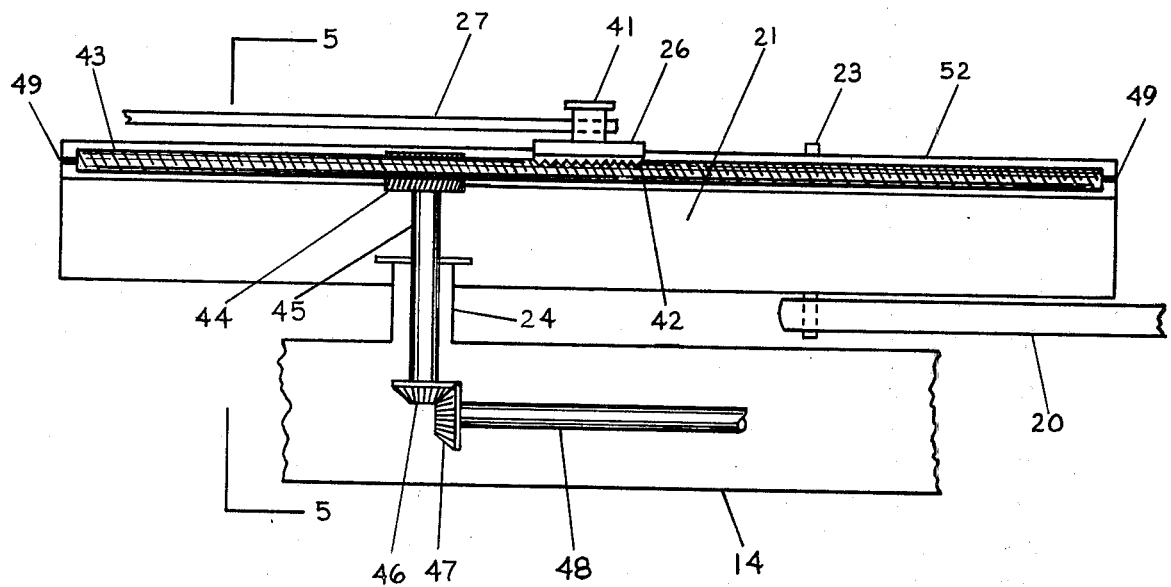
FIG. 4 is a side elevation of the central member and the adjustable resultant member, showing drive means for movement of the adjustable resultant member.

In FIG. 4, a side elevational view of the mechanism for positioned adjustable resultant member 26 is shown, enlarged from the scale of FIG. 1. Central member 21 is shown with first link 20 pivotally attached to the underside thereof at first-link attachment point 23; resultant member 26 is shown pivotally attached to second link 27 at pivot 41. Member 26 has gear teeth 42 on the underside thereof, in mesh with worm shaft 43. Shaft 43 is driven by gear 44 disposed on shaft 45 which passes through fulcrum 24. Shaft 45 is driven through gear 46 by the action of gear 47 disposed on shaft 48 disposed within carrier 14. Worm shaft 43 is carried on bearings 49 in member 21. Shaft 48 is driven through suitable connection from, e.g., shaft 12 of FIG. 1, not shown here, but within the knowledge of those skilled in the art.

In the alternative, shaft 48 can be driven by independent means such as, e.g., a small electric motor mounted on carrier 14, and driving shaft 48 in response to commands from an appropriate source such as a bi-directional motor drive programmed to position the shaft in a predetermined pattern. Those skilled in the art will be aware that machining operations of extreme versatility can be performed with this latter arrangement.

Figure 5:
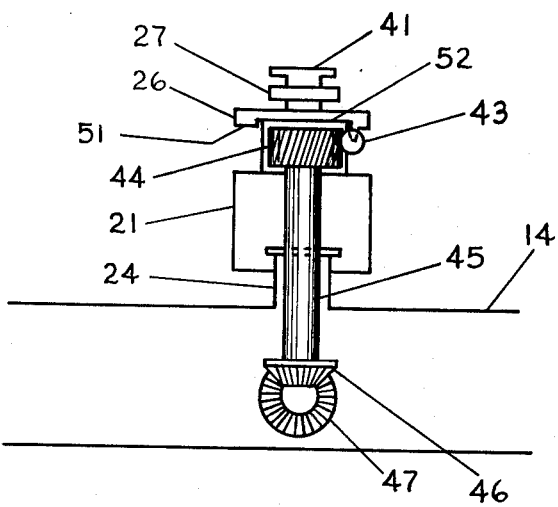
FIG. 5 is a view in section taken along line 5—5 of FIG. 4.

FIG. 5, a sectional view taken along lines 5—5 of FIG. 4, shows the drive and positioning arrangement from a different angle. In FIG. 5, adjustable resultant member 26 is shown with lip 51 engaging flange 52 for lateral stability. Teeth 42, not shown in FIG. 5, engage shaft 43 for longitudinal stability and positioning.

Figure 6:
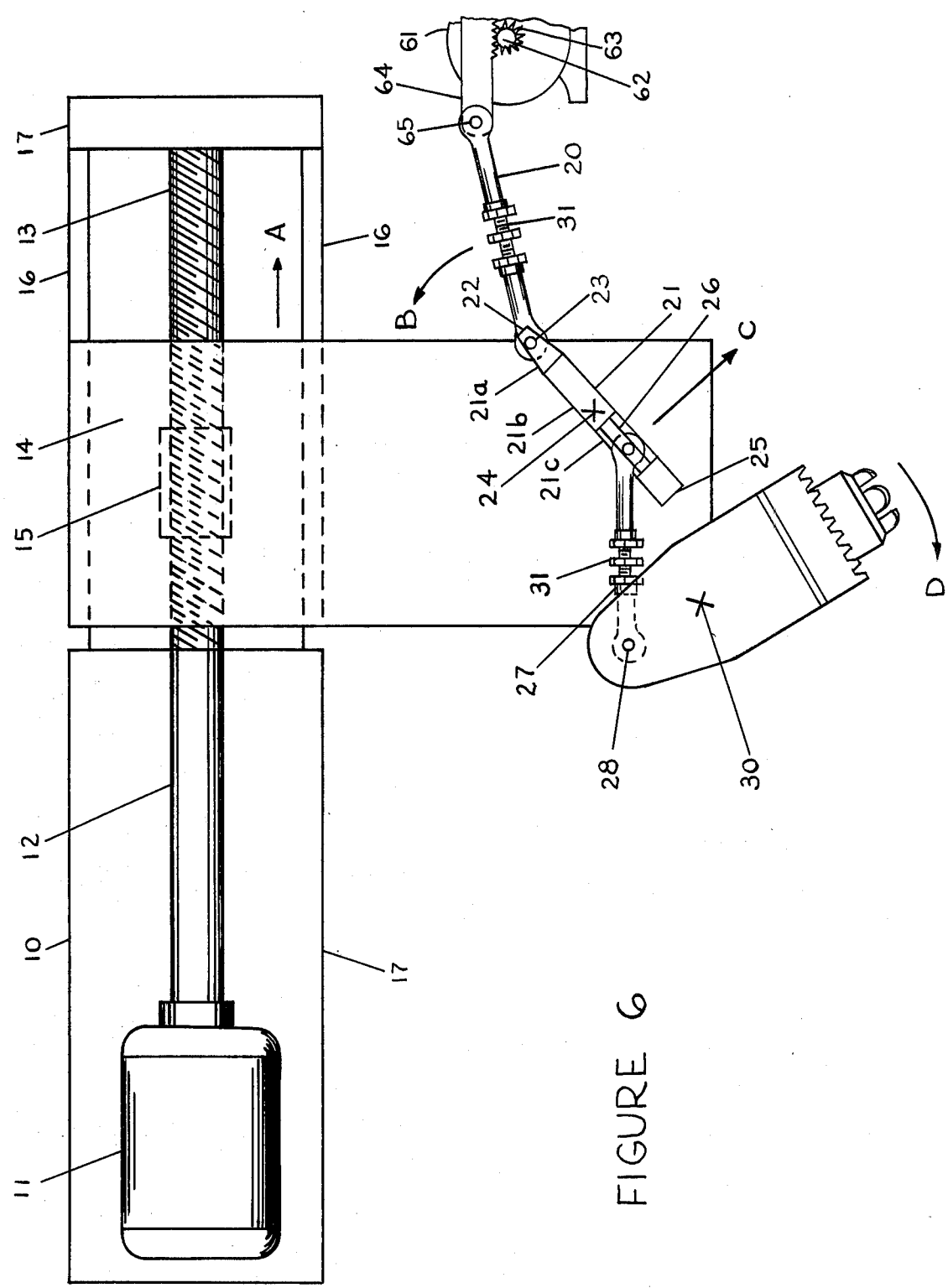
FIG. 6 is an elevational view of an alternative embodiment of the present invention with independent drive means for the first link.

FIG. 6 shows an alternative embodiment of the apparatus of the present invention where the linear position of first link 20 is independent of the motion of carrier 14, and controls the linear position of the oscillations. FIG. 6 is a view of apparatus similar to that of FIG. 1, but the motive power for first link 20 comes from drive means 61, shown here as an electric motor. Means 61 operates shaft 62 to drive gear 63 which imparts linear motion to toothed member 64 pivotally connected at point 65 to first link 20. As discussed above in relation to adjustable resultant member 26, drive means 61 can be programmed to drive first link 20 in any fashion, either coordinated with or independent of the motion of carrier 14, or in any desired relationship with the motion of carrier 14. By appropriate programming and interrelationship of the motions of carrier 14, shaft 48 and means 61, a nearly infinite number of patterns of motion can be produced for holder 29.

Modifications, changes and improvements to the present forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

What is claimed is:

1. Apparatus for variable oscillatory movement comprising a central member having a first end and a second end, a first link pivotally affixed at one end thereof to said central member at a first-link attachment intermediate said first end and said second end, said first link being pivotally mounted at a fixed location at an end opposite said end affixed to said central member, a second link pivotally affixed at one end thereof by an adjustable resultant member to said central member intermediate said first-link attachment and said second end, said central member being pivotally attached to a carrier by a fulcrum, said fulcrum being intermediate said first-link attachment and said second end, said carrier being rectilinearly movable relative to said fixed location.

2. Apparatus of claim 1 wherein said second link is pivotally affixed to a tool holder at an end opposite said end affixed to said central member, said tool holder being mounted to said carrier.

3. Apparatus of claim 1 wherein said central member has three portions.

4. Apparatus of claim 1 wherein said adjustable resultant member is disposable at any point on said central member.

5. Apparatus for variable oscillatory movement comprising a mounting frame and guide means, having drive means and a drive shaft, said drive means operating a carrier by said drive shaft, said carrier moving on said guide means, said frame having pivotally affixed to a point thereon a first link, said first link being pivotally affixed at a first-link attachment to a central member, said central member being pivotally affixed at a fulcrum to said carrier, and having disposed thereon an adjustable resultant member, said resultant member being pivotally affixed to a second link, said second link being pivotally affixed to a tool holder, said tool holder being pivotally affixed to said carrier.

6. Apparatus of claim 5 wherein said drive means is an electric motor.

7. Apparatus of claim 5 wherein said drive means is an electric motor operable in response to external signals in two directions.

8. Apparatus of claim 5 wherein said tool holder consists of a holder for a welding torch.

9. Apparatus of claim 5 wherein said adjustable resultant member is driven by power connection to said drive shaft.

10. Apparatus of claim 5 wherein said adjustable resultant member is driven by an independent drive means.

11. Apparatus of claim 5 wherein said adjustable resultant member is disposable at any point on said central member.

12. Apparatus for variable oscillatory motion comprising a mounting frame and guide means, having drive means and a drive shaft, said drive means operating a carrier by said drive shaft, said carrier moving on said guide means, a first link pivotally affixed at a first-link attachment to a central member, said central member being pivotally affixed at a fulcrum to said carrier, and having disposed thereon an adjustable resultant member, said resultant member being pivotally affixed to a second link, said second link being pivotally affixed to a tool holder, said tool holder being pivotally affixed to said carrier, said first link being pivotally affixed to independent drive means.

13. Apparatus of claim 12 wherein said independent drive means comprises an electric motor having a shaft and gear disposed on said shaft, said gear being in meshing contact with a toothed shaft, said toothed shaft being pivotally affixed to said first link.

14. Apparatus of claim 12 wherein said motor is controlled by external programming.

* * * * *